United States Patent
Horikawa et al.

(10) Patent No.: US 6,397,553 B1
(45) Date of Patent: Jun. 4, 2002

(54) INTERIOR SHOCK ABSORBING STRUCTURE

(75) Inventors: Tooru Horikawa; Mitugu Hashimoto; Hikaru Sunohara, all of Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,031

(22) Filed: Apr. 6, 2000

(30) Foreign Application Priority Data

Apr. 6, 1999 (JP) .......................................... 11-098388

(51) Int. Cl.$^7$ ................................................ E04C 3/30
(52) U.S. Cl. ...................... 52/735.1; 296/188; 296/189; 296/39.1
(58) Field of Search ............................. 52/730.1, 731.2, 52/732.1, 735.1; 296/189, 203.02, 203.03, 210

(56) References Cited

U.S. PATENT DOCUMENTS

| | | | | |
|---|---|---|---|---|
| 5,720,510 A | * | 2/1998 | Daniel et al. ................ | 296/188 |
| 5,833,303 A | * | 11/1998 | Kawai et al. ................ | 296/189 |
| 5,927,786 A | * | 7/1999 | Kawai et al. ............... | 296/39.1 |
| 5,975,623 A | * | 11/1999 | Shikimachi et al. ........ | 296/189 |
| 5,992,923 A | * | 11/1999 | Wycech ....................... | 296/188 |

OTHER PUBLICATIONS

Patent Abstracts of Japan, JP–A 9–123940, published May 13, 1997, Gondo Kenji, Toyota Motor Corp.

* cited by examiner

Primary Examiner—Carl D. Friedman
Assistant Examiner—Steve Varner
(74) Attorney, Agent, or Firm—Martin A. Farber

(57) ABSTRACT

An interior shock absorbing structure for a vehicle includes a shock absorbing member. A roof brace (lateral reinforcing beam) is attached to the inner surface of a roof panel facing a passenger room. The shock absorbing member is attached to the roof brace so as to cover the roof brace at positions nearer to the roof panel with respect to a lower wall member of the roof brace. The shock absorbing member has an inner wall spaced a predetermined long distance a corresponding to a shock absorbing stroke, apart from the lower wall member of the roof brace. The shock absorbing member is able to collapse through a sufficiently long shock absorbing stroke when shocks are exerted thereon.

8 Claims, 4 Drawing Sheets

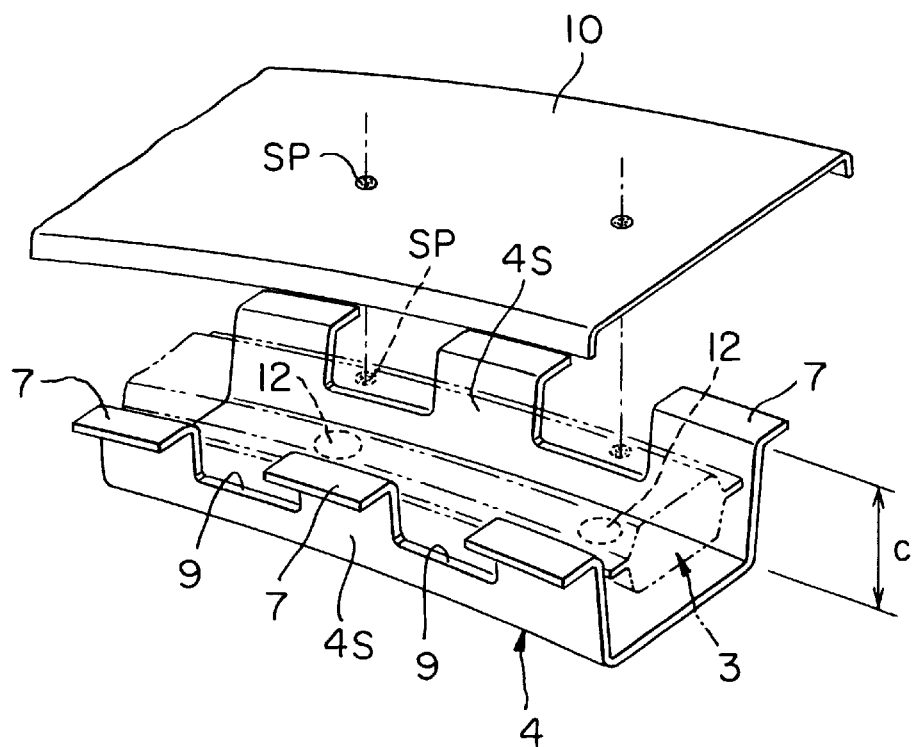
F I G. 2A
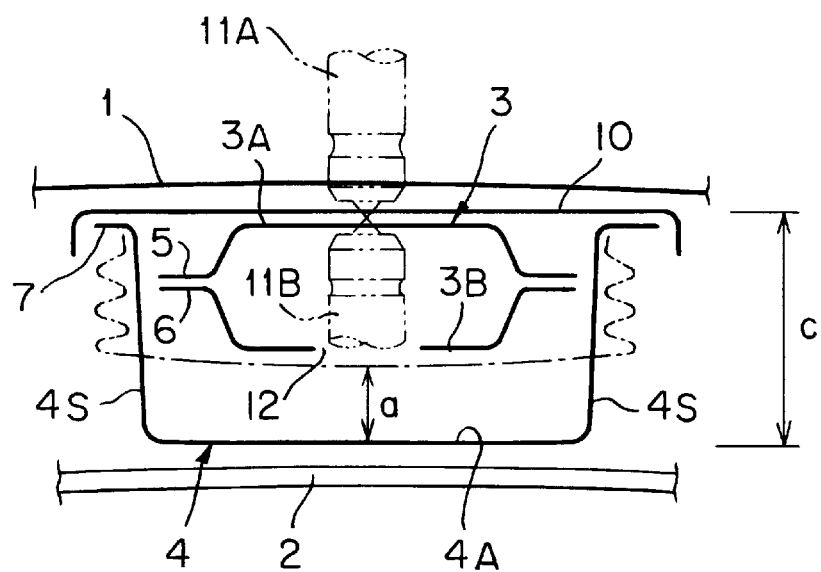
F I G. 2B

INTERIOR SHOCK ABSORBING STRUCTURE

BACKGROUND OF THE INVENTION

1. Field of the Invention

The present invention relates to an interior shock absorbing structure for a vehicle, provided with shock absorbing member disposed on a surface of a reinforcing beam, such as a roof brace for reinforcing a roof panel, on the side of a passenger room to protect passengers.

2. Description of the Prior Art

Generally, a roof panel 1 of a vehicle body is provided on its inner surface facing a passenger room with roof braces 3, i.e., lateral reinforcing beams, as shown in FIG. 3. The roof panel 1 is long if the vehicle is a one-box vehicle, and the long roof panel 1 is provided with a plurality of the roof braces 3 arranged at proper longitudinal intervals.

Generally, the surface of the roof brace 3 facing the passenger room is covered with interior finishing materials called roof trim. If the passenger's head should strike against the roof due to accidental rolling of the vehicle or bounce of the vehicle when the vehicle travels a bumpy road, there is the possibility that the passenger's head strikes against the roof brace 3 and the passenger's head is injured even though the roof brace 3 is covered with the roof trim.

To prevent such an accident, there has been proposed an interior shock absorbing structure having a reinforcing beam and provided on its surface facing the passenger room with a shock absorbing member as shown in FIG. 4. Such interior shock absorbing structure is disclosed in JP-A 9-123940. There has also been proposed and used a similar interior shock absorbing structure having a reinforcing beam as shown in FIG. 5.

The first mentioned known interior shock absorbing structure shown in FIG. 4 does not include a lateral roof brace. As shown in FIG. 4, the structure has a reinforcing panel 24 longitudinally extending along each side of the vehicle roof. The reinforcing panel 24 forms a roof side rail 20 together with a longitudinally extending outer panel 22. The roof side rail 20 functions as a reinforcing beam. An inner panel 26 extends longitudinally and attached to the inner side of the reinforcing panel 24 to form a space of a predetermined thickness H. The inner panel 26 has a thickness smaller than the thicknesses of the outer panel 22 and the reinforcing panel 24, so that, if the passenger's head 32 should strike against the inner panel 26, the inner panel 26 can be easily deformed and is able to absorb shocks.

The second mentioned known interior shock absorbing structure shown in FIG. 5A has a corrugated shock absorbing member 44 extending between right and left side rails 42 on the inner side of a roof panel 1. The shock absorbing member 44 is positioned on the inner surface facing a passenger room of a roof brace 43, i.e., a lateral reinforcing beam. As shown in FIG. 5B, the shock absorbing member 44 has a corrugated shape having a trapezoidal sectional shape and a predetermined shock absorbing stroke a as shown in FIG. 5B. The upper surface of the shock absorbing member 44 is bonded to the roof brace 43.

The shock absorbing members of these known interior shock absorbing structures shown in FIGS. 4, 5A and 5B are provided on their surfaces facing the inner surfaces of the side rails and the roof braces with joining parts, such as flanges, to be fastened to the side rails and the roof braces, respectively.

Therefore, for example, in the interior shock absorbing structure shown in FIGS. 5A and 5B, a force is exerted through a roof trim 2 on the shock absorbing member 44 to deform the same in a shape as indicated by chain lines if the passenger's head should strike against the ceiling in an accident. Accordingly, the passenger's head will not strike directly against the roof brace 43, i.e., the reinforcing beam, and will not be seriously shocked and injury to the passenger can be limited to the least extent.

The joining parts of the shock absorbing member 44, i.e., the upper walls of ridges of the corrugated shock absorbing member 44, is joined to the lower surface of the roof brace 43 facing the passenger room,. Therefore, the shock absorbing member 44 is deformed as indicated by the chain lines when the shock absorbing member 44 absorbs shocks; that is, the side walls 44S of the ridges of the corrugated shock absorbing member 44 collapse. Accordingly, it is impossible to secure a large deformation allowance without reducing the dimensions of the passenger room and hence the shock absorbing ability of the shock absorbing member 44 is limited. The inner panel 26 shown in FIG. 4 also has the same problems.

Accordingly, it is an object of the present invention to provide an interior shock absorbing structure similar to the known interior shock absorbing structure, capable of solving the problems in the known interior shock absorbing structure and of employing a shock absorbing member attached to a reinforcing beam secured to a roof panel and having a large deformation allowance, having an enhanced shock absorbing ability to safely protect passengers.

SUMMARY OF THE INVENTION

According to the present invention. an interior shock absorbing structure for a vehicle has a shock absorbing member attached to a reinforcing beam for reinforcing a roof panel and covering a lower surface facing a passenger room of the reinforcing beam, wherein the shock absorbing member is fixed to the structure at positions nearer to the roof panel than the lower surface of the reinforcing beam.

In the interior shock absorbing structure according to the present invention, the reinforcing beam may have joining flanges, the shock absorbing member may have joining flanges, and the joining flanges of the shock absorbing member may be superposed on and joined fixedly to the joining flanges of the reinforcing beam.

The shock absorbing member may be fixedly joined to a wide bracket joined to an upper wall member on the side of the roof panel of the reinforcing beam.

Furthermore, openings for an electrode for joining the bracket to the upper wall member on the side of the roof panel may be formed in a lower wall member on the side of the passenger room of the reinforcing beam.

The shock absorbing member may be provided with punched recesses for adjusting the buckling strength of the shock absorbing member.

Furthermore, the shock absorbing member may have an inner wall facing the passenger room, and side walls extending from the opposite side edges of the inner wall and having joining parts, respectively.

Since the joining flanges of the shock absorbing member are superposed on the joining flanges of the reinforcing beam and the joining flanges are joined together, the shock absorbing member and the reinforcing beam can be assembled when forming the reinforcing beam by joining together respective joining flanges of the upper and lower wall members of the reinforcing beam, which simplifies processes for constructing the interior shock absorbing structure. Thus, the shock absorbing member can be joined to the reinforcing beam at the positions nearer to the roof panel with respect to the lower wall member of the reinforcing member.

The shock absorbing member is fixedly joined to the wide bracket joined to the upper wall member of the reinforcing beam, and the shock absorbing member is joined to the bracket at positions at a considerable distance toward the roof panel from the lower wall member of the reinforcing beam. Therefore, a long shock absorbing stroke can be obtained to exercise a high shock absorbing ability.

Furthermore, the lower wall member of the reinforcing beam is provided with the openings for receiving the spot welding electrode for spot-welding the upper wall member of the reinforcing beam the bracket, the assembly of the reinforcing beam and the shock absorbing member can be easily joined to the bracket.

The buckling strength of the shock absorbing member can be selectively determined by properly determining the size and the number of the recesses formed in the side walls of the shock absorbing member.

Thus, the present invention provides the interior shock absorbing structure similar to the known interior shock absorbing structure, employing the shock absorbing member attached to the reinforcing beam for reinforcing the roof panel and having a large deformation allowance, having an increased shock absorbing ability to safely protect passengers.

Preferred embodiments of the present invention will be understood from the following detailed description referring to the accompanying drawings.

BRIEF DESCRIPTION OF THE DRAWINGS

FIGS. 2A and 2B are an exploded perspective view and a cross-sectional view, respectively, of an interior shock absorbing structure in a second embodiment of the present invention;

DESCRIPTION OF THE PREFERRED EMBODIMENTS

Figure 1A:
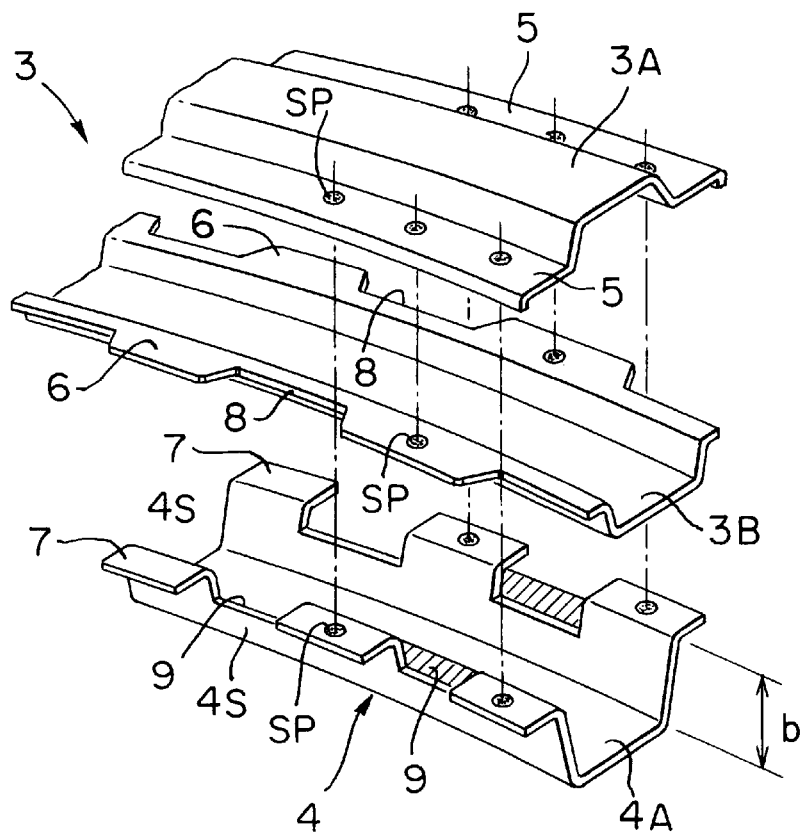
FIGS. 1A and 1B are an exploded perspective view and a cross-sectional view, respectively, of an interior shock absorbing structure in a first embodiment of the present invention.
Figure 1B:
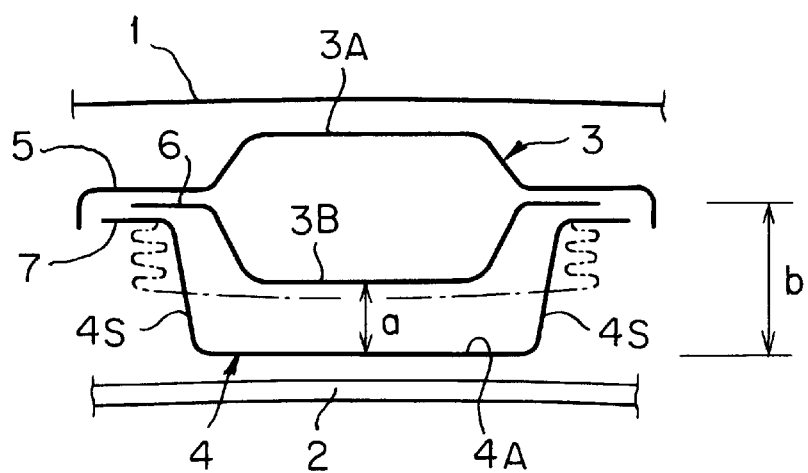
Figure 3:
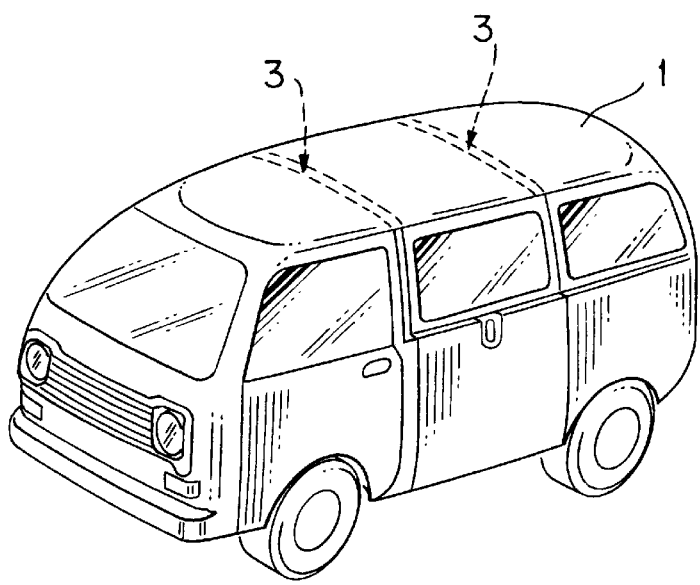
FIG. 3 is a perspective view of a vehicle having a roof panel provided with reinforcing beams.
Figure 4:
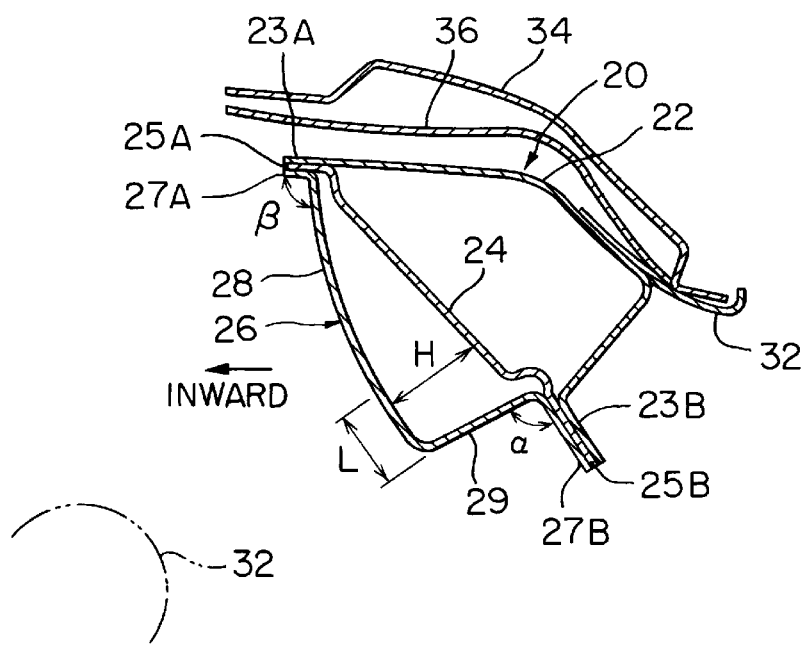
FIG. 4 is a cross-sectional view of a first known interior shock absorbing structure.
Figure 5A:
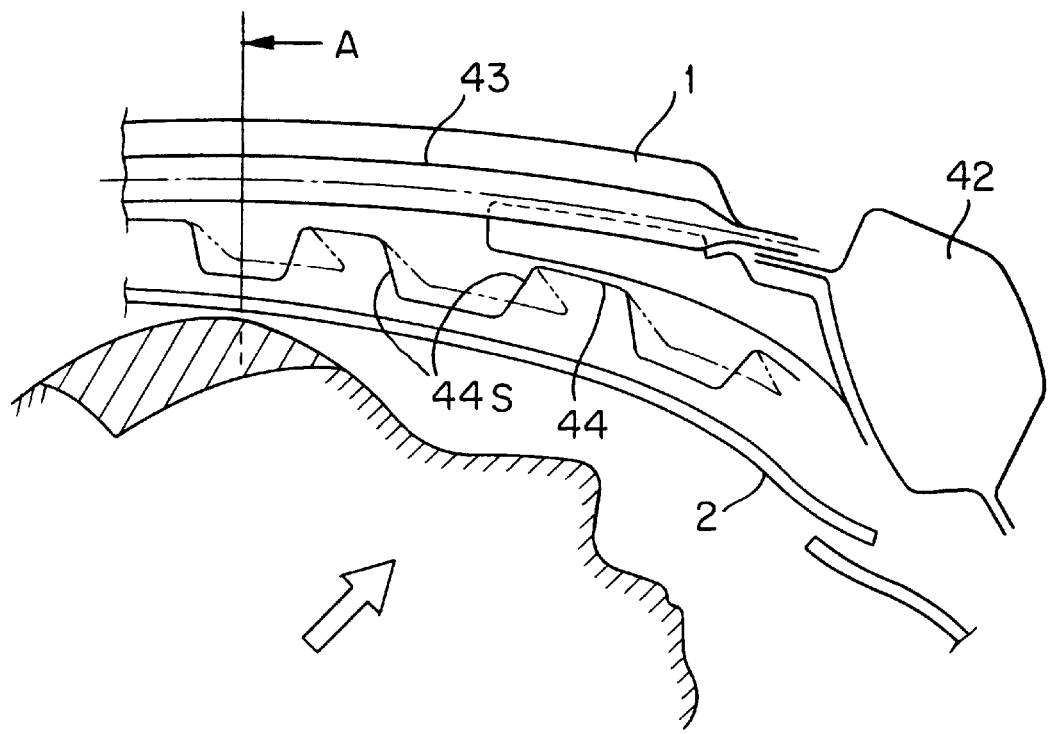
FIGS. 5A and 5B are cross-sectional views of a second known interior shock absorbing structure.
Figure 5B:
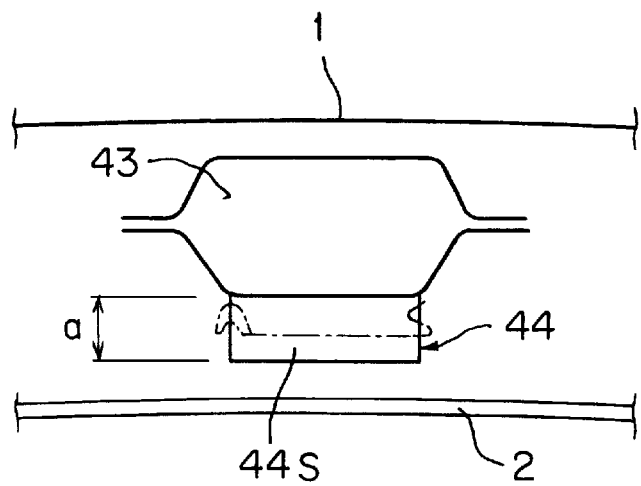

FIGS. 1A and 1B are an exploded perspective view and a cross-sectional view, respectively, of an interior shock absorbing structure in a first embodiment of the present invention. Referring to FIG. 1B, a roof brace 3, i.e., a lateral reinforcing beam, is attached to the inner surface of a roof panel 1 facing a passenger room. A roof trim 2 is disposed on the passenger room side of the roof brace 3 so as to conceal the roof brace 3. A shock absorbing member 4 is disposed between the roof trim 2 and the roof brace 3 so as to extend along the roof brace 3.

The shock absorbing member 4 is attached to the roof brace 3 so as to cover the roof brace 3 at positions nearer to the roof panel 1 with respect to an lower wall member 3B of the roof brace 3 on the passenger room side. The roof brace 3 has an upper wall member 3A having the shape of an inverted channel and provided with joining flanges 5, and the lower wall member 3B having the shape of a channel and provided with joining flanges 6. The roof brace 3 is formed by joining together the flanges 5 of the upper wall member 3A and the flanges 6 of the lower wall member 3B and has a closed section similar to that of a pipe. The shock absorbing member 4 is larger in size than the lower wall member 3B of the roof brace 3 and has a shape similar to that of the lower wall member 3B of the roof brace 3. The shock absorbing member 4 has an inner wall 4A spaced a predetermined distance a apart from the lower wall member 3B of the roof brace 3, and side walls 4S provided with joining flanges 7 and spaced a predetermined distance apart from the side walls of the lower wall members 3B of the roof brace 3.

The joining flanges 5 and 6 of the roof brace 3, and the joining flanges 7 of the shock absorbing member 4 are superposed and joined together by spot welding or the like. Thus, the joining flanges 7 of the shock absorbing member 4 are joined to the flanges 5 and 6 of the roof brace 3 at positions nearer to the roof panel 1 with respect to the inner wall 3B of the roof brace 3 facing the passenger room. The distance b between the joining flanges 7 joined to the flanges 5 and 6 of the roof brace 3 and the inner wall 4A of the shock absorbing member 4 corresponds to a shock absorbing stroke.

As shown in FIG. 1A, the flanges 6 of the lower wall member 3B of the roof brace 3 are provided with recesses 8 formed by punching and longitudinally arranged at predetermined intervals. The side walls 4S of the shock absorbing member 4 are provided with recesses 9 formed by punching and longitudinally arranged at predetermined intervals. The respective flanges 5 and 6 of the upper wall member 3A and the lower wall member 3B of the roof brace 3 are joined together by spot welds SP formed by spot welding.

When shocks are exerted on the inner wall 4A of the shock absorbing member 4, the side walls 4S collapse so that the inner wall 4A comes into contact with the inner wall of the lower wall member 3B of the roof brace 3 and the distance a is reduced to a naught as indicated by chain lines in FIG. 1B to absorb the shocks. In this state, the collapsed side walls 4S of the shock absorbing member 4 surrounds the roof brace 3. Since the flanges 7 of the side walls 4S are joined to the roof brace 3 at the positions nearer to the roof panel 1 with respect to the inner wall of the lower wall member 3B, the side walls 4S can be deformed without interferring with the roof brace 3. Thus, the shock absorbing member 4 is able to be deformed fully through the long shock absorbing stroke b. Thus, the interior shock absorbing structure is capable of effectively protecting the passenger's head from striking against the roof brace 3.

The buckling strength of the side walls 4S of the shock absorbing member 4 can be selectively determined by properly determining the size, number and intervals of the recesses 9 in the side walls 4S.

FIGS. 2A and 2B show an interior shock absorbing structure in a second embodiment of the present invention. Referring to FIG. 2B, a roof brace 3, i.e., a reinforcing beam, has an upper wall member 3A having the shape of an inverted channel and provided with joining flanges 5, and an lower wall member 3B having the shape of a channel and provided with joining flanges 6. The roof brace 3 is formed by joining together the flanges 5 of the upper wall member 3A and the flanges 6 of the lower wall member 3B and has a closed section similar to that of a pipe. A wide bracket 10 is interposed between a roof panel 1 and the roof brace 3. Parts of the upper wall member 3A of the roof brace 3 substantially on a center line of the upper wall member 3A are joined to parts of the bracket 10 substantially on a center line of the bracket 10 by spot welding or the like. A shock absorbing member 4 having side walls 4S provided with flanges 7 and formed in the shape of a channel is disposed on the passenger room side of the roof brace 3. The flanges 7 of the shock absorbing member 4 are fixedly joined to the bracket 10. Consequently, the roof brace 3 is covered entirely with the bracket 10 and the shock absorbing member 4. In this state, the inner wall 4A of the shock absorbing member 4 is spaced a predetermined distance a apart from the lower wall member 3B of the roof brace 3. The inner wall 4A is spaced a predetermined distance c apart from the bracket 10. The distance a corresponds to the shock absorbing stroke of the shock absorbing member 4. The lower wall member 3B of the roof brace 3 is provided with openings 12 for receiving a spot welding electrode 11B for spot-welding the upper wall member 3A of the roof brace 3 to the bracket 10.

As shown in FIG. 2A, the shock absorbing member 4 covering, together with the bracket 10, the roof brace 3 has side walls 4S provided with recesses 9 formed by punching and longitudinally arranged at predetermined intervals. The buckling strength of the side walls 4S of the shock absorbing member 4 can be selectively determined by properly determining the size and number of the recesses 9 in the side walls 4S.

As shown in FIG. 2B, the roof brace 3 and the bracket 10 are joined together by spot welding using a spot welding electrode 11A and the spot welding electrodes 11B before attaching the bracket 10 to the roof panel 1. When spot-welding the roof brave 3 to the bracket 10, the spot welding electrode 11A serving as an anode is applied to the upper surface of the bracket 10, the sport welding electrode 11B serving as a cathode is inserted through the hole 12 formed in the lower wall member 3B of the roof brace 3 in the roof brace 3 and the same is applied to the upper wall member 3A, and then a current is supplied across the spot welding electrodes 11A and 11B for spot welding.

When shocks are exerted on the shock absorbing member 4, the inner wall 4A is deformed so as to be displaced toward the roof brace 3 by the shock absorbing stroke corresponding to the distance a to absorb the shocks. Since the flanges 7 of the shock absorbing member 4 are joined to the bracket 10 at positions nearer to the roof panel 1 with respect to the lower wall member 3B of the roof brace 3 and the side walls 4S are extended so as to cover the roof brace 3, the shock absorbing member 4 is able to be deformed properly without interfering with the roof brace 3. Thus, the interior shock absorbing structure is capable of effectively protecting the passenger's head from striking against the roof brace 3.

Although the invention has been described in its preferred embodiments, changes may be made in the type of the vehicle provided with the roof brace, i.e., the reinforcing beam, the type and shape of the roof panel, the shape of the roof brace, the shape of the shock absorbing member, joints of the roof brace and the shock absorbing member, the shape of the bracket, and the joints of the bracket, the shock absorbing member and the roof brace, and the shape of the recesses of the shock absorbing member without departing from the scope of the invention.

As apparent from the foregoing description, according to the present invention, the shock absorbing member is fixed to the roof structure at positions nearer to the roof panel with respect to the surface facing the passenger room of the reinforcing beam. Therefore, the side walls of the shock absorbing member are able to collapse without interfering with the reinforcing beam through the long shock absorbing stroke to protect the passenger's head effectively from striking against the reinforcing beam.

What is claimed is:
1. An interior shock absorbing structure comprising:
   a reinforcing beam for reinforcing a roof panel;
   a shock absorbing member attached to said reinforcing beam and covering a lower surface facing a passenger room, of said reinforcing beam; and
   said shock absorbing member being fixed to the structure at positions nearer to said roof panel than the lower surface of the reinforcing beam; wherein
   said shock absorbing member has recesses for adjusting buckling strength thereof.
2. The interior shock absorbing structure according to claim 1, further comprising:
   first joining flanges provided on said reinforcing beam;
   second joining flanges provided on said shock absorbing member; and
   said second joining flanges being superposed on and joined fixedly to said first joining flanges.
3. The interior shock absorbing structure according to claim 2, wherein:
   said reinforcing beam comprises an upper wall member and a lower wall member, each of the wall members having the first joining flanges superposed on and joined fixedly to each other.
4. The interior shock absorbing structure according to claim 1, wherein:
   said shock absorbing member is in the form of a channel having side walls, said recesses being formed in the side walls.
5. The interior shock absorbing structure according to claim 4, wherein:
   each of said side walls has a joining part joined to said wide bracket.
6. An interior shock absorbing structure comprising:
   a reinforcing beam for reinforcing a roof panel;
   a shock absorbing member attached to said reinforcing beam and covering a lower surface facing a passenger room, of said reinforcing beam;
   said shock absorbing member being fixed to the structure at positions nearer to said roof panel than the lower surface of the reinforcing beam; and
   a wide bracket joined to an upper surface of the reinforcing beam; and
   said shock absorbing member being fixedly joined to a lower surface of said wide bracket.
7. The interior shock absorbing structure according to claim 6, wherein:
   said shock absorbing member has flanges fixedly joined to said lower surface of the wide bracket.
8. The interior shock absorbing structure according to claim 6, wherein:
   said reinforcing beam has in a lower wall thereof an opening for passing an electrode therethrough when an upper wall of the reinforcing beam is to be joined to said wide bracket by welding.

* * * * *